United States Patent
Hasegawa et al.

(10) Patent No.: US 8,957,553 B2
(45) Date of Patent: Feb. 17, 2015

(54) ELECTRIC MOTOR APPARATUS WITH EQUI-POTENTIALIZED BRACKETS

(75) Inventors: Takehiko Hasegawa, Osaka (JP);
Hirofumi Mizukami, Osaka (JP);
Akihiko Watanabe, Osaka (JP);
Haruhiko Kado, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 329 days.

(21) Appl. No.: 13/132,219

(22) PCT Filed: Dec. 11, 2009

(86) PCT No.: PCT/JP2009/006781
§ 371 (c)(1),
(2), (4) Date: Jun. 1, 2011

(87) PCT Pub. No.: WO2010/067615
PCT Pub. Date: Jun. 17, 2010

(65) Prior Publication Data
US 2011/0234024 A1   Sep. 29, 2011

(30) Foreign Application Priority Data

Dec. 11, 2008 (JP) ................ 2008-315366

(51) Int. Cl.
| H02K 1/04 | (2006.01) |
| H02K 5/16 | (2006.01) |
| H02K 5/173 | (2006.01) |
| H02K 5/08 | (2006.01) |
| H02K 11/00 | (2006.01) |
| H02K 5/24 | (2006.01) |

(52) U.S. Cl.
CPC ............. *H02K 5/1732* (2013.01); *H02K 5/08* (2013.01); *H02K 11/0089* (2013.01)
USPC .................. 310/43; 310/89; 310/90

(58) Field of Classification Search
CPC ............ H02K 1/04; H02K 5/00; H02K 5/04; H02K 5/16; H02K 5/24
USPC ............... 310/43, 45, 46, 89, 90, 91
See application file for complete search history.

(56) References Cited

U.S. PATENT DOCUMENTS

| 7,888,833 B2 | 2/2011 | Okada | |
| 2006/0186746 A1* | 8/2006 | Nanbu et al. | 310/68 R |
| 2008/0042499 A1* | 2/2008 | Okada | 310/43 |

FOREIGN PATENT DOCUMENTS

| JP | 58-019141 A | 2/1983 |
| JP | 61-017848 U | 2/1986 |

(Continued)

OTHER PUBLICATIONS

Machine translation of JP06-133489A (published: May 1994, translated: Feb. 2013).*

(Continued)

*Primary Examiner* — Michael Andrews
(74) *Attorney, Agent, or Firm* — Brinks Gilson & Lione

(57) ABSTRACT

A brushless motor includes a stator molded integrally with a resin having a fixing member including a stator iron core and a winding wound thereon, a rotor of a disk-like iron core holding a ferrite resin magnet in a circumferential direction, the rotor arranged to face the stator about a shaft, a bearing rotatably supporting the shaft, and conductive brackets fixing the bearing. The brackets are electrically connected to each other with a conducting pin in the stator.

4 Claims, 5 Drawing Sheets

(56) References Cited

FOREIGN PATENT DOCUMENTS

| | | | | | |
|---|---|---|---|---|---|
| JP | 62-159143 | U | | 10/1987 | |
| JP | 06-133489 | A | | 5/1994 | |
| JP | 06133489 | A | * | 5/1994 | ............... H02K 1/04 |
| JP | 11-075337 | A | | 3/1999 | |
| JP | 11075337 | A | * | 3/1999 | ............... H02K 5/08 |
| JP | 11-098726 | A | | 4/1999 | |
| JP | 2007-020348 | A | | 1/2007 | |
| JP | 2007-089338 | A | | 4/2007 | |
| JP | 2007089338 | A | * | 4/2007 | ............... H02K 5/16 |
| JP | 2007-159302 | A | | 6/2007 | |
| JP | 2008-289272 | A | | 11/2008 | |

OTHER PUBLICATIONS

Machine translation of JP11-075337 (published Mar. 1999, translated Jan. 2014).*

Machine translation of JP2007-089338 (Apr. 2007).*

Extended European Search Report for European Application No. 09831721.7, dated Aug. 1, 2012, 9 pages.

International Search Report for International Application No. PCT/JP2009/006781, dated Jan. 26, 2010, 2 pages.

* cited by examiner

FIG. 3A
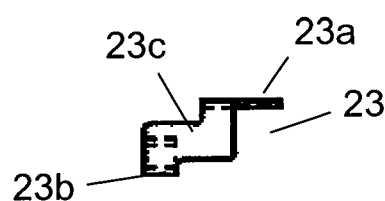
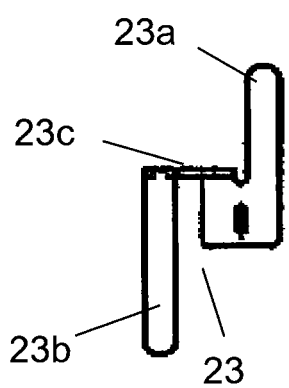
FIG. 3B
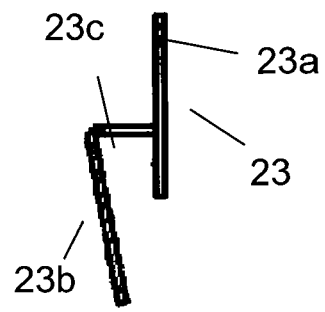
FIG. 3C

ELECTRIC MOTOR APPARATUS WITH EQUI-POTENTIALIZED BRACKETS

This application is a 371 application of PCT/JP2009/006781 having an international filing date of Dec. 11, 2009, which claims priority to JP2008-315366 filed on Dec. 11, 2008, the entire contents of which are incorporated herein by reference.

TECHNICAL FIELD

The present invention relates to brushless motors installed in an air conditioner or the like and, more particularly, to a brushless motor that is improved to lower a generation level of a noise terminal voltage of a fan motor and an electric apparatus provided with the same.

BACKGROUND ART

In recent years, as a fan motor for an air conditioner, a brushless motor has been mainstream to achieve high efficiency. A brushless motor has often employed a method in which a motor is driven by an inverter using a pulse width modulation system (to be arbitrarily referred to as a PWM system hereinafter). In the inverter driving of the PWM system, since the motor is driven by a drive signal of a high-frequency pulse, the drive signal may work as noise to cause electromagnetic interference in an external device. In a general electric apparatus, noise generated in a power supply and flowing into a power supply system of a circuit of another device through an output from the power supply is called a noise terminal voltage. Since the noise terminal voltage serves as a noise source, the noise terminal voltage causes electromagnetic interference to adversely affect a peripheral device.

For example, in an air conditioner, a noise terminal voltage generated from a motor built-in the air conditioner may considerably influence a level of a noise terminal voltage of the main body of the air conditioner. More specifically, in this case, the noise terminal voltage generated from the motor of the air conditioner may sneak into a power supply of another device through an air conditioner power supply and a commercial power supply system to cause electromagnetic interference.

As a method of reducing a noise terminal voltage, various methods such as a method of taking a measure on the air conditioner body side and a method of taking a measure on a fan motor side are known. As the method of taking a measure on the air conditioner body side, a method of enhancing a noise filter of a power supply line, a method of installing a capacitor (bypass capacitor) between the motor and the ground, and the like are known. As the method of taking a measure on a fan motor side, a method of attaching a ferrite core to a lead wiring, a method of adjusting a capacitance of a capacitor of a power supply line, and the like are used. The methods has been generally executed from long ago, and are common knowledge.

In the circumstances, a technique that improves a structure a motor to prevent noise from radiating from the motor is known. As an example of the technique, in a conventional molded motor in which a stator is molded with a resin, a technique that fixes bearings that support a motor shaft by two metal brackets, elastically couples the brackets with each other by a metal spring member, and makes the potentials of the brackets equal to each other to prevent noise from radiating from the motor and to reduce a noise terminal voltage is proposed (for example, see Patent Document 1).

However, the conventional method in Patent Document 1 has the configuration in which the brackets are coupled with each other by the metal spring member on an outer frame of the motor. For this reason, the spring member is easily influenced by external water, dust, impact, or the like, and has a problem in terms of durability. Since the spring member serving as a motor structure also functions to give breaking strength to a bracket, the spring member needs to be strong. For this reason, the spring member is expensive because the spring member is thick and large to pose a problem with cost.

Patent Document 1: Unexamined Japanese Utility Model Publication No. 1987-159143

DISCLOSURE OF THE INVENTION

The present invention provides a brushless motor that has long-term durability and suppresses a noise terminal voltage generated from the motor and an electric apparatus provided with the same. The brushless motor according to the present invention includes: a stator molded integrally with a resin having a fixing member including a stator iron core and a winding wound thereon; a rotor of a disk-like iron core holding a permanent magnet in a circumferential direction, the rotor arranged to face the stator about a shaft; a bearing rotatably supporting the shaft; and two conductive brackets fixing the bearing, wherein the two brackets are electrically connected to each other with a conducting member in the stator.

In the configuration of the brushless motor according to the present invention, the stator is integrally molded together with the stator iron core on which the winding is wound and a conductive conducting pin serving as a conducting member, the conducting pin is arranged inside the stator, and the two brackets are electrically connected to the conducting pin arranged inside the stator.

The brushless motor according to the present invention may have a configuration in which the two brackets are electrically connected to each other together with the stator iron core.

The brushless motor according to the present invention may have a configuration in which the two brackets are electrically connected to each other together with the stator iron core, and the conducting pin is electrically connected to an outer circumference side of the stator iron core in the stator.

With the above configuration, a large conductive end plate need not be arranged on the outer frame of the motor, and the two brackets can be electrically connected to each other by a simple configuration in which the conducting member is arranged inside the stator. For this reason, the conducting member is protected with a molding resin, is not influenced by water, dust, impact, and the like, and can be configured to have long-term durability of conductivity.

The electric apparatus of the present invention includes the brushless motor described above installed therein.

BRIEF DESCRIPTION OF THE DRAWINGS

FIG. 3A is a top view showing a shape of a conducting pin of the brushless motor.

FIG. 3B is a front view showing a shape of a conducting pin of the brushless motor.

FIG. 3C is a side view showing a shape of the conducting pin of the brushless motor.

DETAILED DESCRIPTION OF THE PREFERRED EMBODIMENTS

A brushless motor according to the present invention and an electric apparatus provided with the same will be described below with reference to the drawings.

(Embodiment 1)

Figure 1:
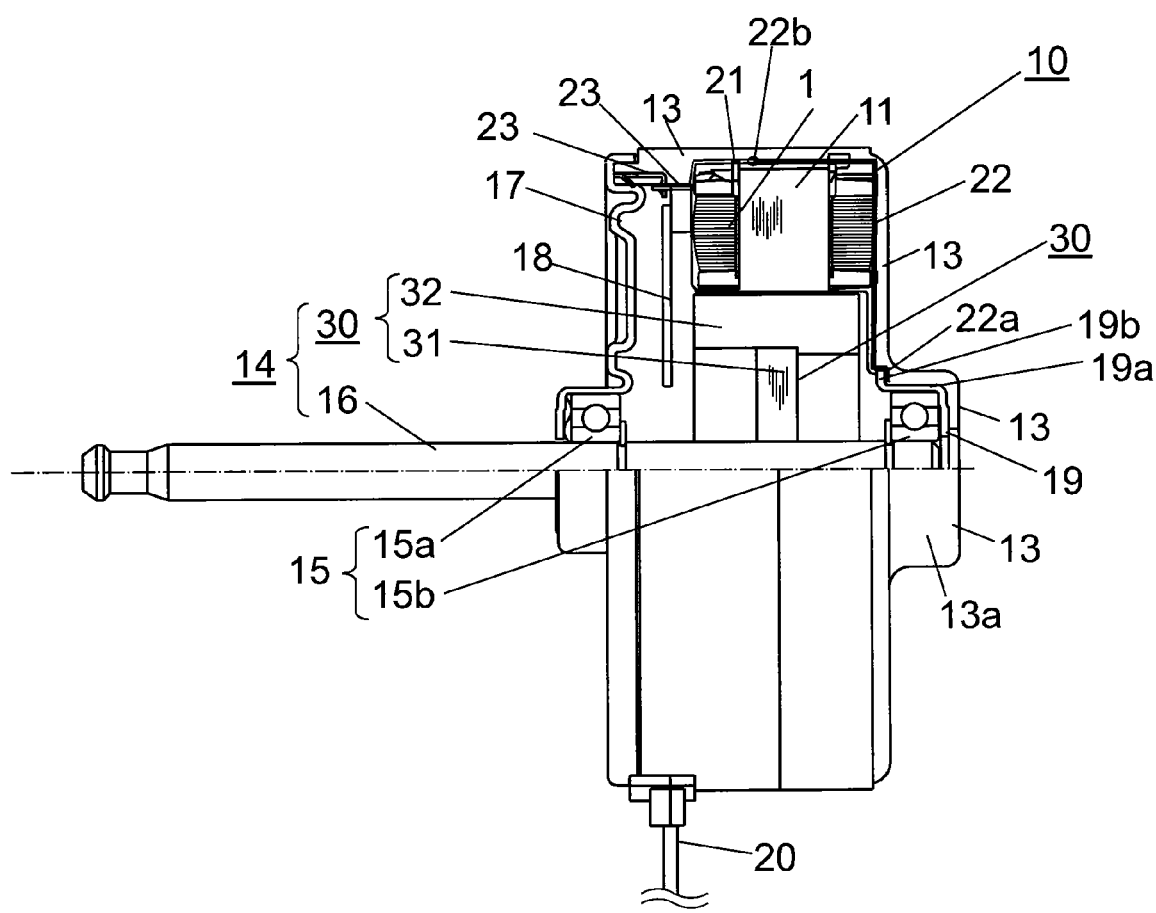
FIG. 1 is a diagram showing a configuration of a brushless motor according to Embodiment 1 of the present invention.

FIG. 1 is a diagram showing a configuration of a brushless motor according to Embodiment 1 of the present invention. In the present embodiment, an example of a brushless motor that is a motor to drive a blowing fan mounted for an air conditioner serving as an electric apparatus will be described. In the present embodiment, an inner rotor type brushless motor in which a rotor is rotatably arranged on an inner circumference side of a stator will be described.

In FIG. 1, on stator iron core 11, stator winding 12 is wound through insulator 21 serving as a resin to insulate stator iron core 11. Stator iron core 11 is molded together with another fixing member with insulating resin 13 serving as a molding material. In the present embodiment, the members are integrally molded to configure stator 10 having a generally cylindrical shape as an outer shape.

Inside stator 10, rotor 14 is inserted via a gap (not shown). Rotor 14 has disk-like rotating body 30 including rotor iron core 31 and shaft 16 that fastens rotating body 30 to penetrate the center of rotating body 30. Rotating body 30 holds ferrite resin magnet 32 serving as a permanent magnet in a circumferential direction to face the inner side of stator 10. In this manner, rotating body 30 includes rotor iron core 31 serving as a metal iron core and ferrite resin magnet 32 arranged in a circumferential direction thereof. The inner circumference side of stator 10 and an outer circumference side of rotating body 30 are arranged to face each other.

Two bearings 15 that support shaft 16 are fixed to shaft 16 of rotor 14. Bearing 15 is a cylindrical bearing having a plurality of iron balls, and a inner ring side of bearings 15 is fixed to shaft 16. In FIG. 1, on an output shaft side serving as a side on which shaft 16 projects from a brushless motor body, bearing 15a supports shaft 16. On the opposite side (to be referred to as an anti-output shaft side hereinafter), bearing 15b supports shaft 16. Outer ring sides of bearings 15 are fixed with metal brackets having conductivity, respectively. In FIG. 1, bearing 15a on the output shaft side is fixed with bracket 17, bearing 15b on the anti-output shaft side is fixed with bracket 19. With this configuration, shaft 16 is supported by two bearings 15, and rotor 14 is rotatably rotated.

Furthermore, in the brushless motor, printed wiring board 18 on which a drive circuit including a control circuit is mounted is built in. After printed wiring board 18 is built in, bracket 17 is press-fitted in stator 10 to form a brushless motor. Connection wiring 20 for a power supply of the drive circuit, a ground line, and a control signal or the like are connected to printed wiring board 18.

A zero potential point on printed wiring board 18 on which the drive circuit is mounted is insulated from the earth and a primary (power supply) circuit and floats on the earth and the potential of the primary power supply circuit. In this case, the zero potential point is a wiring point having a zero-volt potential serving as a reference potential on printed wiring board 18, and, in general, indicates a ground line called a ground. The ground line included in connection wiring 20 is connected to the zero potential point, i.e., the ground wire.

A power supply circuit that is connected to printed wiring board 18 on which the drive circuit is mounted and supplies a power supply voltage for the winding, a power supply circuit that supplies a power supply voltage for the control circuit, the lead wiring for a control voltage and ground line for the control circuit, and the like are insulated from the earth. More specifically, the power supply circuits, the ground line, and the like are electrically insulated from all a primary (power supply) circuit for the power supply circuit that supplies the power supply voltage for the winding, a primary (power supply) circuit for the power supply circuit that supplies the power supply voltage for the control circuit, the earth connected to the primary (power supply) circuits, and the earth that is independently grounded. More specifically, since the drive circuits mounted on printed wiring board 18 are electrically insulated from the primary (power supply) circuit potential and the potential of the earth, the drive circuits are in a floating state. This is a state in which the potential floats.

For this reason, a configuration including the power supply circuit that supplies the power supply voltage for the winding and the power supply circuit that supplies the power supply voltage for the control circuit, the power supply circuits being connected to printed wiring board 18, is also called a floating power supply.

When the power supply voltages and a control signal are supplied to the brushless motor configured as described above through connection wiring 20, stator winding 12 is driven by the drive circuit on printed wiring board 18 to cause a drive current to flow in stator winding 12, and a magnetic field is generated from stator iron core 11. By the magnetic field from stator iron core 11 and the magnetic field from ferrite resin magnet 32, an attractive force and a repulsive force are generated depending on the polarities of the magnetic fields, and the forces rotate rotor 14 about shaft 16.

A more detailed configuration of the brushless motor will be described below. In the brushless motor, as described above, shaft 16 is supported by two bearings 15, and bearings 15 are fixed and supported by brackets, respectively. Furthermore, in order to secure strength to fix bearings 15 and suppress a drawback or the like by creeping, in the present embodiment, bearings 15 are fixed with metal brackets having conductivity, respectively.

More specifically, in a shaft bearing such as a bearing, in general, for example, when a void is formed between an outer ring and a housing inner circumferential surface, a force in a radial direction is generated on a shaft by a transmission load. When such a force is generated, a slipping phenomenon is easily generated by a relative difference in a radial direction. The slipping phenomenon is called creeping. Based on this standpoint, in the present embodiment, conductive brackets processed with a steel plate in advance and having preferable dimensional accuracy are employed to fix bearings 15. In particular, when a high-output motor is required, the configuration described above is more preferable.

More specifically, bearing 15b on the anti-output shaft side is fixed with bracket 19 having a size almost equal to an outer circumference diameter of bearing 15b. Bracket 19 is integrally molded together with insulating resin 13. More specifically, as shown in FIG. 1, the shape of insulating resin 13 on the anti-output shaft side is a shape including main-body projecting portion 13a projecting from the main body of the brushless motor toward the anti-output shaft. Bracket 19 is arranged on the inner side of the main body of main-body projecting portion 13a as an inner bracket to integrally mold insulating resin 13 and bracket 19. Bracket 19 has a cup-like shape that is a hollow cylindrical shape. More specifically, bracket 19 has cylindrical portion 19a having an opening at one end and annular fringe portion 19b slightly extending from the cylindrical end portion on the opening side to the outside. The inner circumference diameter of cylindrical portion 19a is almost equal to the outer circumference diameter of bearing 15b. Bearing 15b is inserted into cylindrical portion 19a to also fix bearing 15b to insulating resin 13 through bracket 19.

With the configuration, since the outer ring side of bearing 15b is fixed to metal bracket 19, a drawback caused by creeping can be suppressed. The outer circumference diameter of fringe portion 19b is set to be slightly larger than the outer circumference diameter of bearing 15b. More specifically, the outer circumference diameter of fringe portion 19b is set to be larger than the outer circumference diameter of bearing 15b and smaller than at least the outer circumference diameter of rotating body 30. When bracket 19 is designed to have the above shape, a metal material that increases the cost is suppressed from being used in comparison with a structure in which, for example, a fringe portion extends to stator 10 over the outer circumference of rotating body 30. Metal bracket 19 is suppressed from increasing in area as described above, and bracket 19 is integrally molded together with insulating resin 13 to cover the outer frame of bracket 19 with insulating resin 13. For this reason, noise can be suppressed from being generated from bearing 15b.

Bearing 15a on the output shaft side is fixed by bracket 17 having an outer circumference diameter almost equal to an outer circumference diameter of stator 10. Bracket 17 has a generally disk-like shape and has a projecting portion having a diameter almost equal to the outer circumference diameter of bearing 15a at the center of the disk, and the inner side of the projecting portion is hollow.

After printed wiring board 18 is built-in, the inner side of the projecting portion of bracket 17 is inserted into bearing 15a. Accordingly, when bracket 17 is press-fitted on stator 10 such that a connection terminal arranged on the outer circumference of bracket 17 is fitted on a connection terminal of stator 10, the brushless motor is formed. With the above configuration, an assembling operation is made easy, and the outer ring side of bearing 15a is fixed to metal bracket 17. For this reason, a drawback caused by creeping is suppressed.

For the meantime, since metal shaft 16 is inserted into the inner ring sides of two bearings 15, the inner rings of bearings 15 necessarily have the same potential. On the other hand, the outer rings of two bearings 15 are structured to be stored in bracket 17 and bracket 19, respectively. However, bracket 17 and bracket 19 are arranged on both the sides of the stator, i.e., on the output shaft side and the anti-output shaft, respectively. For this reason, the two brackets do not generally have the same potential. In the present embodiment, in order to made the potentials of the two brackets, i.e., bracket 17 and bracket 19 equal to each other, both the brackets are electrically connected by conducting pin 22 and conducting pin 23 (will be described next). As described above, it is known that noise radiation or a noise terminal voltage from a motor is reduced by electrically connecting the plurality of brackets to each other, In order to connect bracket 17 and bracket 19 to each other, conducting pin 22 serving as a conducting member is electrically connected to bracket 19 in advance. More specifically, as shown in FIG. 1, one distal end portion 22a of conducting pin 22 is connected to fringe portion 19b of bracket 19. Conducting pin 22 is arranged in insulating resin 13, and, like bracket 19, conducting pin 22 is integrally molded together with insulating resin 13.

When conducting pin 22 is arranged in insulating resin 13, conducting pin 22 is protected from rust or external force to obtain a reliable electric connection with respect to a using environment, external stress, or the like. Conducting pin 22 extends from fringe portion 19b toward the outer circumference of the brushless motor in insulating resin 13, and conducting pin 22 further extends from a position near the outer circumference of the brushless motor to the output shaft side in almost parallel with shaft 16. At another distal end portion 22b of conducting pin 22, conducting pin 23 to be electrically connected to bracket 17 is connected to conducting pin 22. Conducting pin 23 extends to the output shaft side, and distal end portion 23b of conducting pin 23 is exposed from an end face of insulating resin 13 on the output shaft side. More specifically, when bracket 17 is press-fitted in stator 10, distal end portion 23b of conducting pin 23 is brought into contact with bracket 17 to secure conductivity between bracket 17 and conducting pin 23.

With the configuration, the two brackets including bracket 17 and bracket 19 are electrically connected to each other through conducting pin 22 and conducting pin 23. The brushless motor is a molded motor in which a fixing member is molded with insulating resin 13. However, a relation between two bearings 15 the outer rings of which are potentially equal to each other is equivalent to a structure of a general steel plate motor.

Figure 2A:
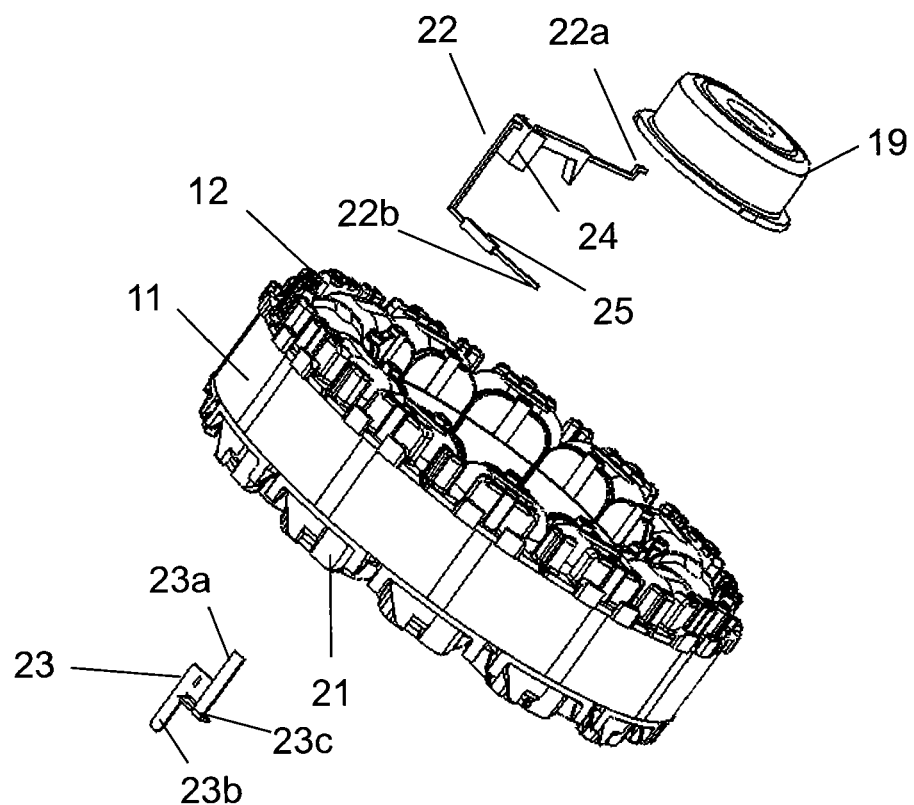
FIG. 2A is an exploded perspective view showing a configuration of a stator before a fixing member is molded in the brushless motor according to Embodiment 1 of the present invention.
Figure 2B:
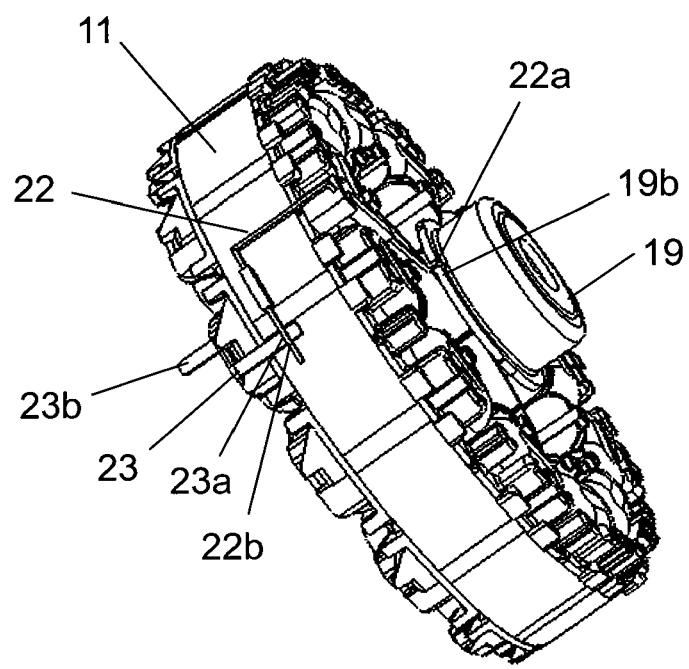
FIG. 2B is a diagram showing a manner in which fixing members are integrated before the fixing members are molded in the brushless motor according to Embodiment 1 of the present invention.

Detailed configurations of conducting pins 22 and 23 will be described below. FIG. 2A and FIG. 2B are diagrams showing a configuration of a stator before a fixing member is molded in the brushless motor according to Embodiment 1 of the present invention. FIG. 2A is an exploded perspective view showing fixing members before molding, and FIG. 2B is a diagram showing a manner in which fixing members are integrated before the fixing members are molded.

As shown in FIG. 2A, stator winding 12 is wound on stator iron core 11 via insulator 21. Conducting pin 22 in the present embodiment has a shape extending from distal end portion 22a on bracket 19 side to distal end portion 22b while being bent at rights. As shown in FIG. 2B, distal end portion 22a of conducting pin 22 is connected to fringe portion 19b of bracket 19. Conducting pin 22 extends from fringe portion 19b in the outer circumference direction of the brushless motor through a portion near stator winding 12. At this time, in order to secure insulation of stator winding 12, conducting pin 22 holds laterally-facing U-shaped resin portion 24. Resin portion 24 is fitted on insulator 21 and fixed to insulator 21. In this manner, conducting pin 22 is held on stator iron core 11 while being insulated from stator winding 12.

Conducting pin 22 is bent at almost right angles near the outer circumference of the brushless motor, and further extends on the outer circumference surface of stator iron core 11 in almost parallel with shaft 16. Conducting pin 22 is further bent at almost right angles on the outer circumference surface of stator iron core 11, and extends in a circumferential direction. At this time, conducting pin 22 is designed to penetrate cylindrical resin portion 25 to be insulated from stator iron core 11. In this manner, when resin portion 25 is formed, conducting pin 22 is prevented from being in contact with stator iron core 11. Conducting pin 22 extends in the circumferential direction, and is connected to conducting pin 23 at distal end portion 22b.

FIG. 3A, FIG. 3B, and FIG. 3C are diagrams showing shapes of conducting pin 23 of the brushless motor in Embodiment 1 of the present invention. FIG. 3A shows a shape of conducting pin 23 from the upper side, FIG. 3B shows the shape from the front side, and FIG. 3C shows the shape from the lateral side. As shown in FIG. 3A, FIG. 3B, and FIG. 3C, conducting pin 23 has such a shape that two extending plate-like bodies on distal end portion 23a side and the distal end portion 23b side are connected through nipping portion 23c. Nipping portion 23c is inserted into insulator 21 to nip insulator 21, and distal end portion 23a is connected to conducting pin 22 by soldering or the like to fix conducting pin 23.

As described above, the fixing member as shown in FIG. 3B is integrally molded with insulating resin 13 to form stator 10. On stator 10, distal end portion 23b of conducting pin 23 is exposed from insulating resin 13.

The brushless motor according to the present embodiment configured as described above is manufactured according to the following steps. Stator winding 12 is wound on stator iron core 11 including insulator 21, and stator iron core 11 as shown in FIG. 2A and FIG. 2B is formed. Resin portion 24 of conducting pin 22 is fixed to stator iron core 11 formed as described above such that resin portion 24 is fitted on insulator 21, and conducting pin 23 connected to conducting pin 22 is inserted into insulator 21 and fixed. In this manner, conducting pin 22 and conducting pin 23 are attached to stator iron core 11 on which stator winding 12 is wound. Thereafter, stator iron core 11 is molded with insulating resin 13 to form stator 10. At this time, stator 10 is formed such that distal end portion 23b of conducting pin 23 is exposed from and projects from insulating resin 13.

Rotor 14 to which bearings 15 are attached is inserted into stator 10 formed as described above. More specifically, bearing 15b is inserted into a hollow cylindrical portion in stator 10 to fix bearing 15b to stator 10. Printed wiring board 18 is inserted from the output shaft side. The inner side of the projecting portion of bracket 17 is inserted into bearing 15a, and bracket 17 is press-fitted in stator 10 such that the connection terminal formed on the outer circumference of bracket 17 and the connection terminal of stator 10 are fitted to each other. For this reason, distal end portion 23b of conducting pin 23 is brought into contact with bracket 17, and bracket 17 and bracket 19 are electrically connected to each other. In this manner, the brushless motor is formed.

In the above description, a configuration in which bracket 17 and bracket 19 are electrically connected to each other is exemplified. However, a configuration in which bracket 17 and bracket 19 are electrically connected to each other and also electrically connected to stator iron core 11 may be used. With this configuration, bracket 17, bracket 19, and stator iron core 11 have the same potential. In this case, resin portion 25 is not formed, and, at the place of resin portion 25, conducting pin 22 is electrically connected to stator iron core 11 by welding, soldering, or the like. In this manner, depending on the presence or absence of resin portion 25 on conducting pin 22, it can be easily controlled whether stator iron core 11 is electrically connected to brackets 17 and 19.

As described above, the brushless motor according to the present invention includes: a stator molded integrally with a resin having a fixing member including a stator iron core and a winding wound thereon; a rotor of a disk-like iron core holding a permanent magnet in a circumferential direction, the rotor arranged to face the stator about a shaft; a bearing rotatably supporting the shaft; and two conductive brackets fixing the bearing. The two brackets are electrically connected to each other with a conducting member in the stator. With this configuration, the two brackets can be electrically connected to each other by the simple configuration in which conducting member is arranged inside the stator. For this reason, since the conducting member is protected with a molding resin, the conducting member is not influenced by water, dust, impact, and the like, and can be configured to have long-term durability. Therefore, according to the present invention, there can be provided a brushless motor that has long-term durability and suppresses a noise terminal voltage generated from the motor.

(Embodiment 2)

In the present embodiment, a configuration of an air conditioner indoor unit will be described as an example of an electric apparatus in the present invention.

Figure 4:
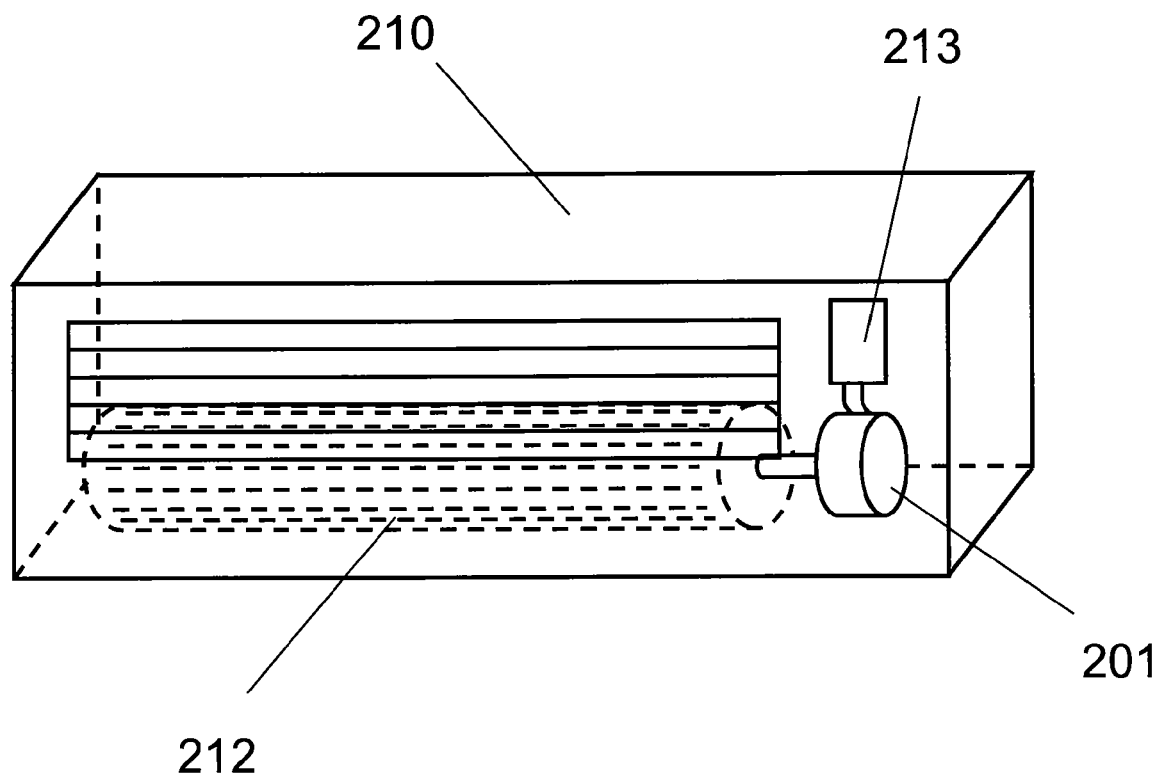
FIG. 4 is a pattern diagram showing a configuration of an air conditioner indoor unit as an example of an electric apparatus in Embodiment 2 of the present invention.

FIG. 4 is a pattern diagram showing a configuration of an air conditioner indoor unit as an example of an electric apparatus in Embodiment 2 of the present invention.

In FIG. 4, brushless motor 201 is installed in housing 211 of air conditioner indoor unit 200. Cross flow fan 212 is attached to a rotating shaft of brushless motor 201. Brushless motor 201 is driven by motor drive apparatus 213. Energization from motor drive apparatus 213 rotates brushless motor 201. Accordingly, cross flow fan 212 rotates. With the rotation of cross flow fan 212, air conditioned by a heat exchanger (not shown) for an indoor unit is sent into a room. As brushless motor 201, for example, the brushless motor described in the above embodiment can be applied.

The electric apparatus according to the present invention includes a brushless motor and a housing in which the brushless motor is installed. As the brushless motor, the brushless motor according to the present invention having the above configuration is employed.

In the above description, as an example of the electric apparatus according to the present invention, a brushless motor installed in an air conditioner indoor unit is employed. However, the present invention can also be applied to a brushless motor installed in an air conditioner outdoor unit, a brushless motor installed in another electric apparatus, for example, brushless motors used in various consumer electronics, brushless motors installed in various information devices, and a brushless motor used in an industrial machine.

Industrial Applicability

Since the brushless motor according to the present invention has long-term durability and can suppress a noise terminal voltage generated from the motor, the brushless motor is advantageously used as a brushless motor installed in an apparatus that mainly requires a motor having a low price and a long life, for example, an air conditioner indoor unit, an air conditioner outdoor unit, a water heater, an air purifier, or the like.

The invention claimed is:

1. A brushless motor comprising:
   a stator including a stator iron core and windings wound thereon molded together by a layer of resin mold;
   a printed wiring board with a drive circuit mounted thereon for energizing the windings, no part of the printed wiring board being molded in the resin mold;
   a rotor of a disk-like iron core arranged to face the stator about a shaft;
   a pair of bearings rotatably supporting the shaft;
   two conductive brackets fixing the pair of bearings, respectively; and
   a conducting member electrically connecting the two brackets to each other, wherein the conducting member runs inside the layer of resin so that the conducting member is electrically insulated from the stator iron core, and no part of the conducting member is in physical contact with the printed wiring board.

2. The brushless motor according to claim 1, wherein the conducting member is electrically insulated from the windings.

3. The brushless motor according to claim 1, wherein the conducting member has one end exposed out of the layer of resin mold.

4. An electric apparatus comprising a brushless motor according to claim 1.

\* \* \* \* \*